United States Patent
Moritomo (10) Patent No.: US 9,794,431 B2
(45) Date of Patent: Oct. 17, 2017

(54) COMMUNICATION APPARATUS, METHOD OF CONTROLLING COMMUNICATION APPARATUS AND STORAGE MEDIUM THAT REDUCE USER OPERATION LOAD FOR PRINTING AN IMAGE

(71) Applicant: CANON KABUSHIKI KAISHA, Tokyo (JP)

(72) Inventor: Kazuo Moritomo, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 10 days.

(21) Appl. No.: 14/543,232

(22) Filed: Nov. 17, 2014

(65) Prior Publication Data

US 2015/0156347 A1 Jun. 4, 2015

(30) Foreign Application Priority Data

Nov. 29, 2013 (JP) ................................. 2013-248337

(51) Int. Cl.
*H04N 5/232* (2006.01)
*H04N 1/00* (2006.01)

(52) U.S. Cl.
CPC . *H04N 1/00278* (2013.01); *H04N 2201/0055* (2013.01); *H04N 2201/0084* (2013.01)

(58) Field of Classification Search
CPC .................................................. H04N 1/00278
See application file for complete search history.

(56) References Cited

U.S. PATENT DOCUMENTS

| 6,976,084 | B2 * | 12/2005 | Pineau | G06Q 30/02 |
| | | | | 358/1.15 |
| 7,720,477 | B2 | 5/2010 | Moritomo et al. | 455/435.1 |
| 7,882,196 | B2 | 2/2011 | Fujii et al. | 709/208 |
| 8,503,933 | B2 | 8/2013 | Moritomo et al. | 455/41.2 |
| 8,572,222 | B2 | 10/2013 | Sakai et al. | 709/223 |
| 8,743,398 | B2 * | 6/2014 | Park | H04L 63/08 |
| | | | | 358/1.15 |
| 8,953,198 | B2 | 2/2015 | Moritomo | H04N 5/765 |
| 2002/0065873 | A1 * | 5/2002 | Ishizuka | G06Q 30/0613 |
| | | | | 709/203 |

(Continued)

FOREIGN PATENT DOCUMENTS

| JP | 2004-328272 A | 11/2004 |
| JP | 2013-214802 A | 10/2013 |
| JP | 2014137665 A * | 7/2014 |

OTHER PUBLICATIONS

Ethan, "How to Connect Samsung Galaxy S3 to Wi-Fi Router using WPS?", Sep. 1, 2012.*

(Continued)

*Primary Examiner* — Gary C Vieaux
(74) *Attorney, Agent, or Firm* — Fitzpatrick, Cella, Harper & Scinto (57) ABSTRACT

A communication apparatus, comprises a wireless communication unit configured to provide a wireless parameter to an image processing apparatus that processes data of the communication apparatus; and a control unit configured to, in a case where the wireless parameter can be shared with the image processing apparatus by the wireless communication unit, cause the image processing apparatus to execute processing of the data without receiving a selection of an image processing apparatus.

9 Claims, 9 Drawing Sheets

(56) References Cited

U.S. PATENT DOCUMENTS

| | | | | |
|---|---|---|---|---|
| 2002/0184378 A1* | 12/2002 | Pineau | ............... | G06Q 30/02 709/230 |
| 2008/0205315 A1* | 8/2008 | Park | ............... | H04W 76/064 370/310 |
| 2009/0271709 A1* | 10/2009 | Jin | ............... | H04W 12/08 715/739 |
| 2010/0146129 A1* | 6/2010 | Nakahara | ............... | H04W 48/12 709/228 |
| 2013/0083356 A1* | 4/2013 | Yu | ............... | G06F 3/1204 358/1.15 |
| 2013/0301081 A1 | 11/2013 | Moritomo et al. | ... | H04W 76/02 |
| 2014/0023061 A1 | 1/2014 | Sakai et al. | ............... | H04W 76/021 |
| 2014/0253965 A1* | 9/2014 | Asai | ............... | G06F 3/1205 358/1.15 |
| 2016/0269571 A1* | 9/2016 | Kusaka | ............... | H04N 1/00281 |

OTHER PUBLICATIONS

Japanese Office Action issued in corresponding Japanese Application No. 2013-248337 dated Aug. 28, 2017.

\* cited by examiner

COMMUNICATION APPARATUS, METHOD OF CONTROLLING COMMUNICATION APPARATUS AND STORAGE MEDIUM THAT REDUCE USER OPERATION LOAD FOR PRINTING AN IMAGE

BACKGROUND OF THE INVENTION

Field of the Invention

The present invention relates to a communication apparatus, a method of controlling a communication apparatus, and a storage medium.

Description of the Related Art

In recent years, digital cameras (hereinafter referred to as a DSC (Digital Still Camera)) and printers equipped with a wireless LAN function in compliance with an IEEE 802.11 standard have appeared, and processing for printing image data via wireless communication has become possible.

In Japanese Patent Laid-Open No. 2004-328272, a technique in which a name of a printer capable of communicating by wireless communication is displayed in a DSC, wireless communication is established between the DSC and the printer by selection using this user interface, and image data is wirelessly transmitted to the printer and printed is disclosed.

Also, in DSCs in recent years, devices have appeared in which an access point function in compliance with the IEEE 802.11 standard is equipped. With this, from a form up until now in which a DSC and a printer are in a wireless connection via an access point (hereinafter referred to as a base station), it has become possible for a DSC and a printer to directly connect wirelessly. By combining with a standard called PictBridge which has established a procedure for when a DSC and a printer directly connect, it becomes possible to print by directly transmitting an image of the DSC to the printer wirelessly.

However, because a print procedure in a current form in which a DSC and printer are wirelessly connected directly uses an existing procedure using wireless communication via an access point, operation of a user can be cumbersome. For example, even if the situation is such that the user only has one of each of the DSC and the printer as wireless terminals, it is necessary to perform a procedure for selecting the print destination printer on the DSC.

The present invention provides a technique, in view of the above described problem, in which, in a case where a communication apparatus such as a DSC and an image processing apparatus such as a printer are used by having connected wirelessly, a load of an operation of a user is reduced.

SUMMARY OF THE INVENTION

According to one aspect of the present invention, there is provided a communication apparatus, comprising: a wireless communication unit configured to provide a wireless parameter to an image processing apparatus that processes data of the communication apparatus; and a control unit configured to, in a case where the wireless parameter can be shared with the image processing apparatus by the wireless communication unit, cause the image processing apparatus to execute processing of the data without receiving a selection of an image processing apparatus.

Further features of the present invention will become apparent from the following description of exemplary embodiments with reference to the attached drawings.

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

Below, explanation will be given for an example using a wireless LAN system conforming to the IEEE 802.11 standard, but the communication form is not necessarily limited to this. Also, explanation is given in the embodiments of an approach in which a DSC becomes a base station and generates a wireless network, and a printer joins the wireless network. However, configuration may also be taken such that the DSC and the printer connect wirelessly directly using an adhoc mode of the IEEE 802.11 standard. A feature and object that are common amongst the embodiments is that printing is possible by the DSC and the printer being directly connected wirelessly, and image data of the DSC being transmitted directly to the printer wirelessly.

First Embodiment

Figure 1:
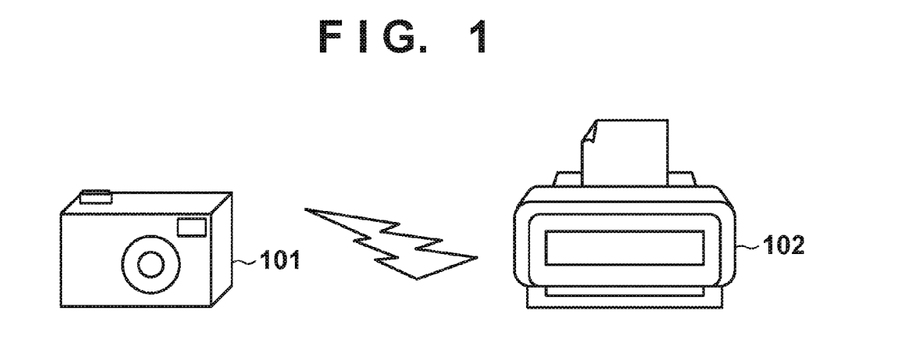
FIG. 1 is a view for illustrating an example configuration of a communication system according to a first embodiment.

FIG. 1 is a view for illustrating an example configuration of a communication system according to this embodiment. A DSC 101 (a communication apparatus) is equipped with an access point function supporting the IEEE 802.11 standard, and the DSC 101 can function as a base station that creates a wireless network. A printer 102 that is equipped with a wireless LAN function is trying to join the wireless network that the DSC 101 constructs as a wireless terminal.

Figure 2:
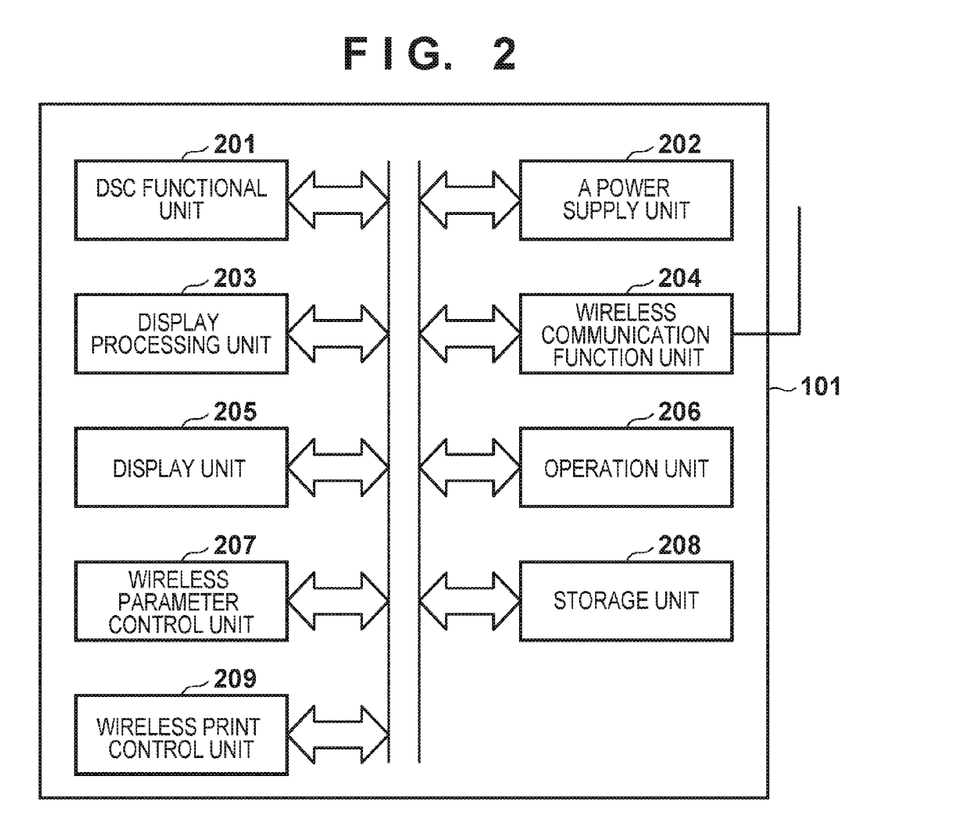
FIG. 2 is a functional block diagram of a communication apparatus (a DSC) according to the first and a second embodiment.

With reference to FIG. 2, explanation will be given for a configuration of a wireless terminal in the DSC 101. The DSC 101 is equipped with a DSC functional unit 201, a power supply unit 202, a display processing unit 203, a wireless communication function unit 204, a display unit 205, an operation unit 206, a wireless parameter control unit 207, a storage unit 208, and a wireless print control unit 209.

Figure 3:
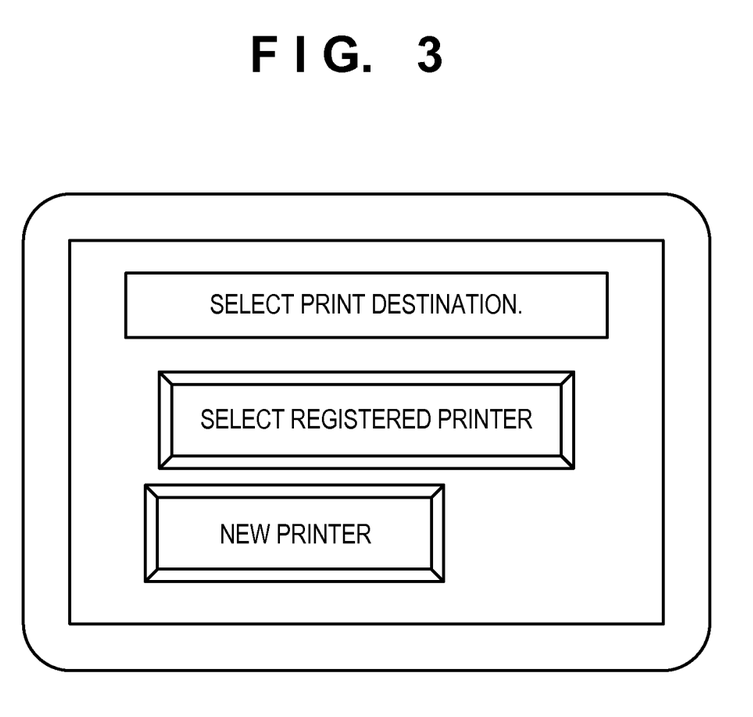
FIG. 3 is a view for illustrating an example of a display screen that a display unit 205 displays according to the first and second embodiments.

The DSC functional unit 201 actually processes a function such as image capturing processing, or the like, as the DSC. The power supply unit 202 supplies the DSC functional unit 201, the wireless communication function unit 204, or the like, with power for functions necessary for the DSC 101 to operate. The display processing unit 203 is an LCD display, an LED display, or the like, which displays to the display unit 205 display content as control or information for a user regarding a wireless function. One example is shown in FIG. 3. As shown in FIG. 3, when a user prints an image in the DSC 101, it is possible to display such that a printer which is a print destination can be selected. The display processing unit 203 and the operation unit 206 perform an operation such as setting pertaining to a wireless function in a cooperative manner.

The wireless communication function unit 204 functions as a wireless terminal conforming to the IEEE 802.11 standard. In this embodiment, because the DSC operates as a base station, a base station function is provided. Note, it is possible to search for the base station and to connect wirelessly to the base station as a conventional wireless terminal, and wireless communication by an adhoc network is also possible. The operation unit 206 is equipped with a setting button that provides a trigger for initiating a wireless print with a later explained printer 102, or a trigger for initiating processing of a wireless parameter automatic setting system referred to as WPS (abbreviation of Wi-Fi Protected Setup™).

In other words, the display unit 205 and the operation unit 206 are user I/Fs pertaining to a wireless function of the DSC 101. For these blocks that relate to the wireless function, processing is performed by a CPU. A program controlled by the CPU is stored in the storage unit 208 which is configured in a RAM, a flash ROM, or the like. Wireless parameters generated upon wireless network generation are stored in the storage unit 208. Also, data processed by the CPU is written to the storage unit 208, and read in from the storage unit 208.

The wireless parameter control unit 207 generates necessary wireless parameters when the DSC 101 generates the wireless network as a base station. Also, when a wireless terminal joins the generated wireless network, a WPS function is executed in order to provide the wireless terminal with the wireless parameters. The wireless print control unit 209, in accordance with a state of a selection of a printer to be the image print destination for the DSC 101, determines print operation details that cause display processing for displaying to the display processing unit 203, and determines display contents.

The printer 102 is a printing apparatus equipped with a wireless terminal function supporting the IEEE 802.11 standard, and equipped with a WPS function for easily acquiring wireless parameters for joining the wireless network.

Above, the configuration of the communication system of FIG. 1, and the configuration of the communication apparatus (the DSC) of FIG. 2 was explained. In the communication system of FIG. 1, printing of image data is attempted by the DSC 101 and the printer 102 performing direct wireless communication. Here, a wireless print is realized with a reduced number of operations by the user.

Figure 4A:
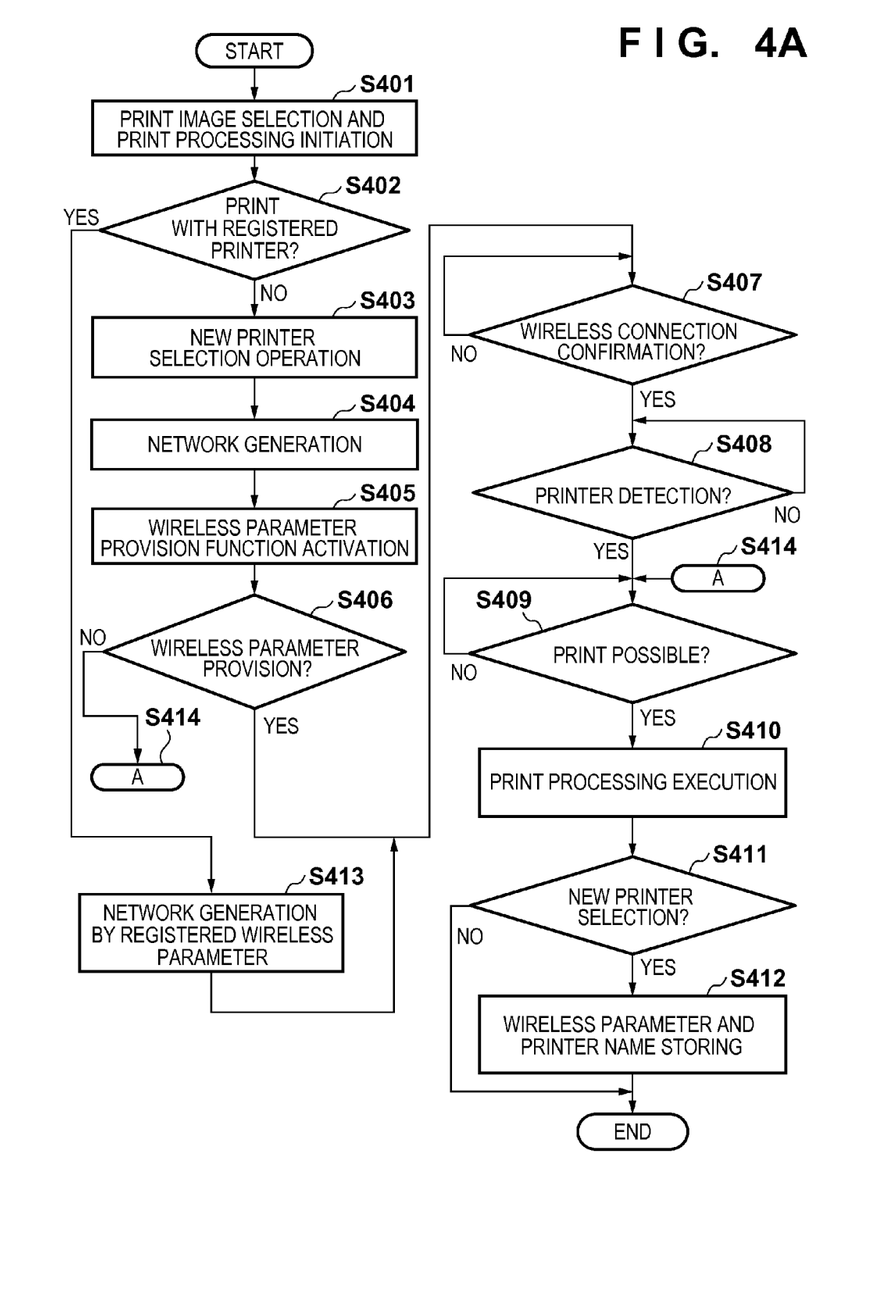
FIG. 4A and FIG. 4B are flowcharts for showing a processing procedure that the communication apparatus (a DSC 101) according to the first embodiment executes.
Figure 4B:
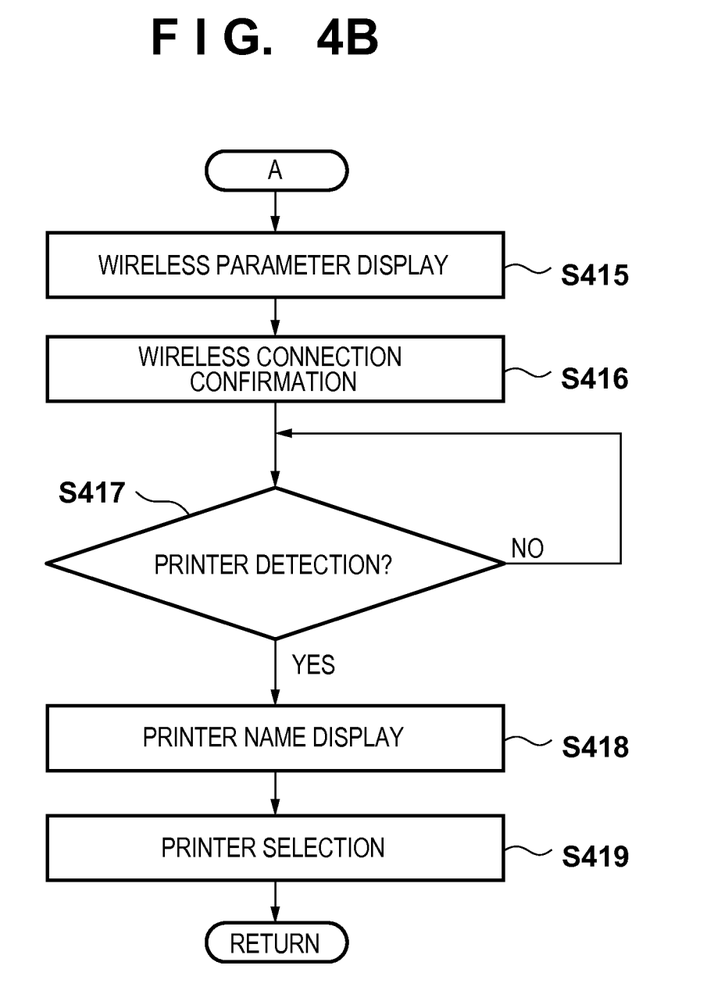
Figure 5:
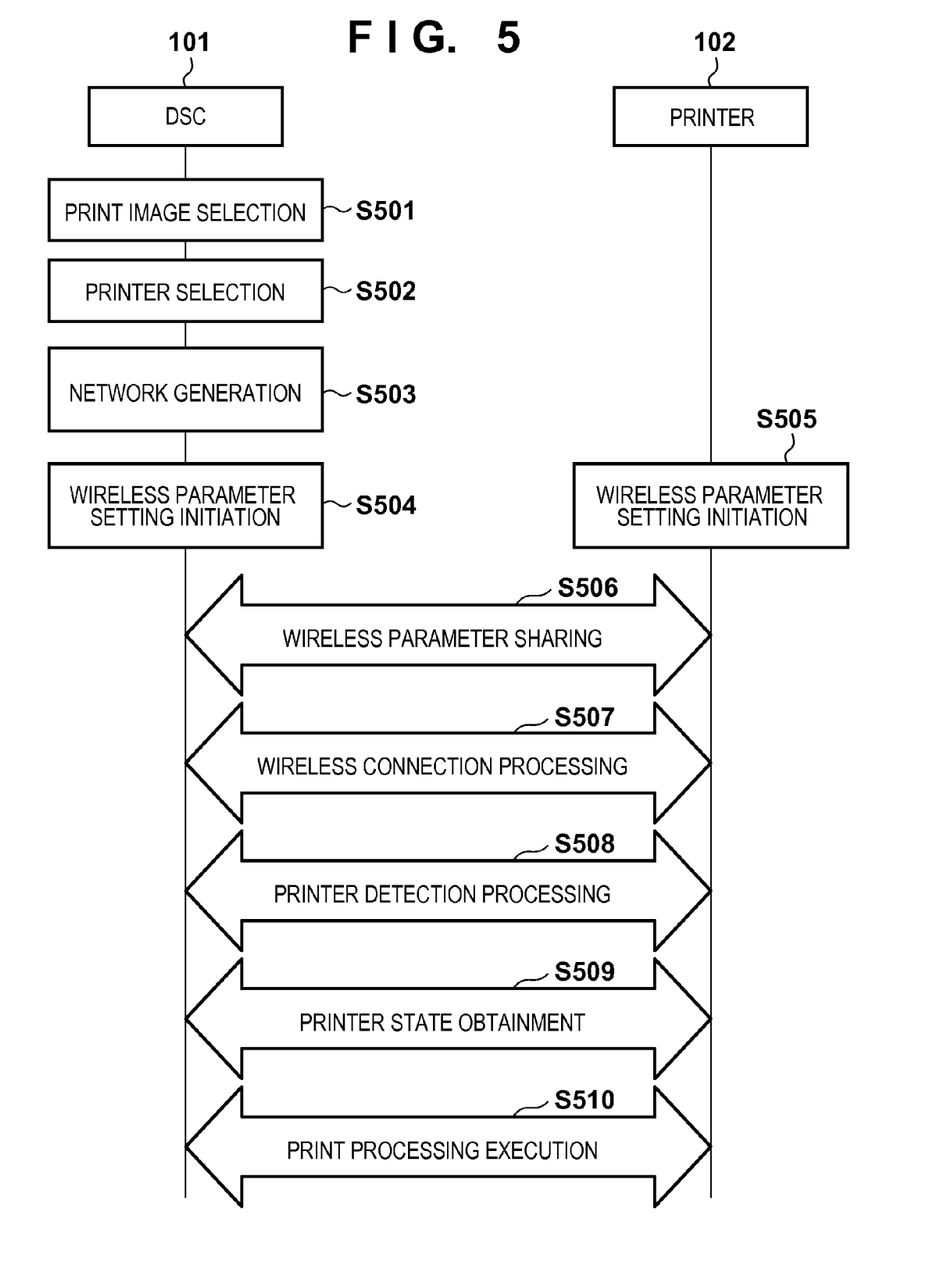
FIG. 5 is the sequence diagram of the communication apparatus (the DSC 101) and a printing apparatus (a printer 102) according to the first embodiment.

Below, explanation will be given for a specific approach using flowcharts of FIG. 4A and FIG. 4B, and a sequence diagram of FIG. 5. It is assumed that a user of the DSC 101 tries to print image data stored in the DSC 101. The user of the DSC 101 selects an image that the user wishes to print, and using the display unit 205 and the operation unit 206 initiates print processing (step S401, step S501). The DSC 101 allows the user to select by displaying to the display unit 205 a selection screen that receives input of "registered printer" for selecting a printer that was used in the past, or "new printer" for selecting a printer that is used for the first time, as shown in FIG. 3 accompanying this operation (input reception processing: step S402, step S502).

First a case where "new printer", for selecting a printer to use for the first time, is selected is explained. When the user selects (step S403) "new printer" which is displayed on the display unit 205 as is shown in FIG. 3, the wireless parameter control unit 207 of the DSC 101 newly generates wireless parameters, and the wireless communication function unit 204, based on these wireless parameters, generates a wireless network (step S404, step S503). In addition, the WPS function is initiated in order to provide the wireless parameters to a printer that connects to the wireless network (step S405, step S504). The wireless parameter control unit 207 confirms whether or not it was able to provide the wireless parameter to the printer 102 via the WPS function (step S406, step S506).

Meanwhile, an operation for executing a wireless print on the printer 102 is performed. Because the printer 102 is connected to the wireless network that the DSC 101 generates, the WPS function in the printer 102 is initiated (step S505). When the wireless network is generated by the DSC 101, the printer 102 acquires the wireless parameters via the WPS function (step S506). The wireless network generated by the DSC 101 is connected to using these wireless parameters (step S507), and preparation for printing is initiated.

Here, explanation will be given for a case where the WPS function is not equipped in the printer 102, and the wireless parameters could not be provided by the DSC 101 (step S406: No). In a case where the wireless print control unit 209 of the DSC 101 determines that the wireless parameters could not be provided (step S414), the DSC 101 displays wireless parameters generated by the wireless parameter control unit 207 to the display unit 205 (step S415). By inputting the wireless parameters displayed to the DSC 101 into the printer 102, the printer 102 is enabled to connect to the wireless network that the DSC 101 generated (step S416, step S507). When the wireless print control unit 209 detects the printer connected to the wireless network (step S417, step S508), printer names are displayed to the display unit 205 (step S418), and the user selects a desired printer (step S419). Here, the reason that the printer names are displayed is that it is possible that a plurality of printers join the wireless network because the wireless parameters are displayed to the display unit 205 of the DSC 101 by previous processing. Processing for selecting the printer is necessary keeping this case in mind. Note, because, in the sequence diagram of FIG. 5, explanation is given for a case in which a WPS function is equipped in the printer, "printer selection processing" is not shown.

Next, explanation will be given for a case where the WPS function is equipped in the printer 102, and the wireless parameters could be provided by the DSC 101 (step S406: Yes). In the DSC 101, the wireless parameter control unit 207, after confirming that the wireless parameters can be provided, confirms that the wireless connection with the printer 102 has been completed (step S407, step S507). Furthermore, printer detection processing is executed as confirmation processing to confirm that connected devices are printers (step S408, step S508).

The DSC 101 generates the wireless network with newly generated wireless parameters, and in addition it is only to one device that it can provide the wireless parameters by the WPS function simultaneously. Thus, the wireless terminal that is able to join the wireless network is only the printer 102, and only one printer is detected. Because, in a case where thereafter the DSC 101 can share the wireless parameters with the printer 102 by the WPS function, the processing for the user selecting the printer is unnecessary, the wireless print control unit 209 omits the printer selection processing.

As described above, the print destination for the image data of the DSC 101 is determined. After the DSC 101 confirms with the printer that it is in a printable state (step S409, step S509), the image data is transmitted to the printer 102 from the DSC 101, and print processing is executed in the printer 102 (step S410, step S510).

Here, in a case where "new printer" is selected (step S411: Yes), the wireless print control unit 209, at a point in time when the printing has completed, stores in the storage unit 208 the wireless parameters used in the print processing and the printer name in association (step S412). In a case where the print processing is executed thereafter, when "registered printer" of FIG. 3 is selected (step S402, step S502), the stored printer name will be displayed. By selecting the printer name, it becomes possible to generate the wireless network by the stored wireless parameters (step S413).

Thereafter, it becomes possible to perform a wireless print of image data of the DSC 101 on the printer 102 by executing the same processing (step S408-step S410, step S507-step S510). Note, even in such a case, because the printer that stores the wireless parameters is only one registered printer, processing for selecting the printer name becomes unnecessary.

As explained above, if the printer 102 is equipped with the WPS function, desired image data print processing within the DSC 101 becomes possible by the DSC 101 selecting a print image and executing only processing for selecting "registered printer" or "new printer". In other words, in a case where, in wireless connection processing between a DSC and a printer, the wireless parameters are shared using a wireless parameter sharing function such as WPS, a procedure for selecting the printer to be the print destination on the DSC is omitted. With this, it becomes possible for a user to print image data of the DSC 101 wirelessly on the printer 102 by simple operation.

In this way, by virtue of the present embodiment, it becomes possible to reduce the operation of the user in printing work in a configuration in which a communication apparatus which is a DSC, or the like, and a printer are directly wirelessly connected.

Second Embodiment

Figure 6:
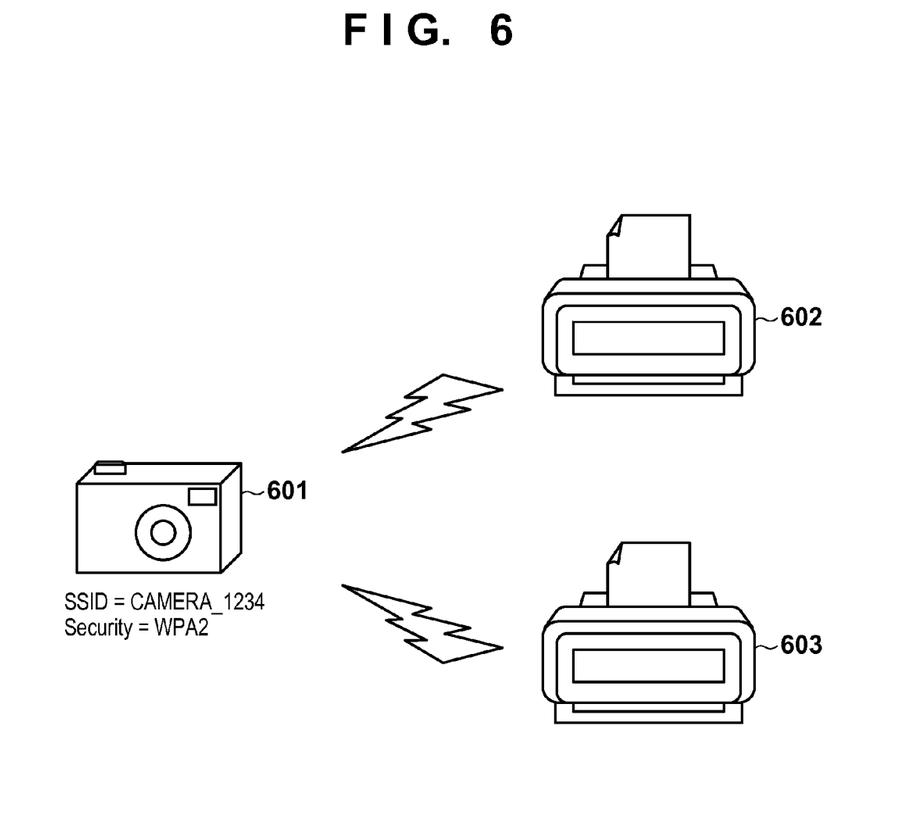
FIG. 6 is a view for illustrating an example configuration of a communication system according to the second embodiment.

In the first embodiment, explanation was given for a case where every time the DSC generates a wireless network, the wireless parameters are newly generated. In contrast to this, in this embodiment, explanation will be given for a case in which the wireless parameters used when the DSC generates the wireless network are fixed. Note, a DSC 601 according to the embodiment is the same as the DSC 101 of the first embodiment, and the difference between the two is only the approach to generation of the wireless parameters. A printer 602 and a printer 603 are printing apparatuses equipped with a wireless terminal function supporting the IEEE 802.11 standard, and equipped with a WPS function for easily acquiring the wireless parameters for joining the wireless network.

FIG. 6 is a view for illustrating an example configuration of the communication system according to this embodiment.

The DSC 601 is equipped with an access point function supporting the IEEE 802.11 standard, and the DSC 601 can function as a base station that creates a wireless network. Here, a wireless network is configured with an "SSID", which is a network identifier, of "CAMERA_1234", and network security of "WPA2". The printer 602, which is equipped with a wireless LAN function, is trying to join the wireless network that the DSC 601 constructs as a wireless terminal. In this embodiment, it is assumed that the DSC 601 attempts to print on the printer 602, and that the printer 602 does not belong to any wireless network. The printer 603 is a printer for which previously print processing of image data was performed by directly wirelessly connecting with the DSC 601. Also, the printer 603 stores that "SSID" is "CAMERA_1234" and "security" is "WPA2" as wireless parameters of the wireless network that the DSC 601 generates. A power supply activation has been performed for the printer 602, and the printer 602 is in a state in which it is detecting a wireless network based on the stored wireless parameters.

Figure 7A:
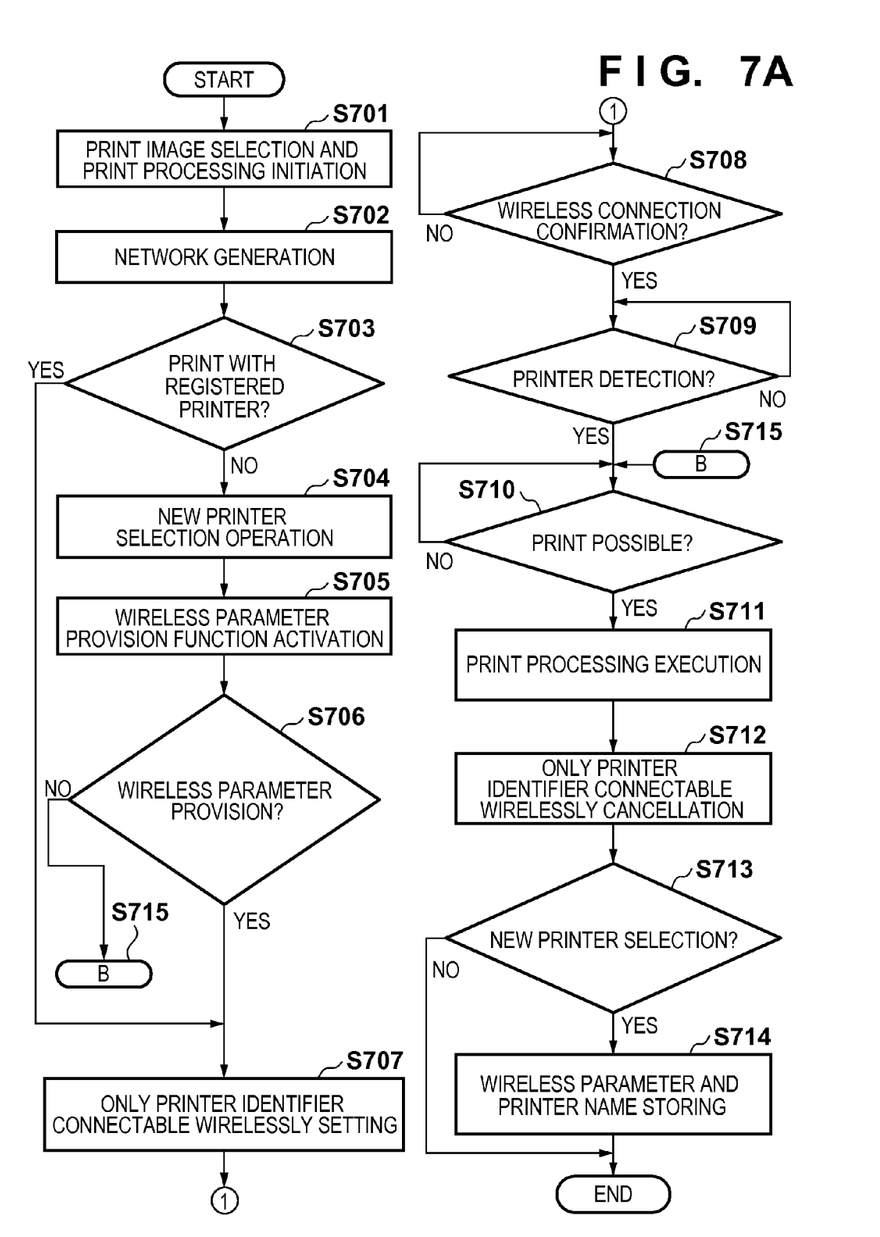
FIG. 7A and FIG. 7B are flowcharts for showing a processing procedure that the communication apparatus (a DSC 601) according to the second embodiment executes.
Figure 7B:
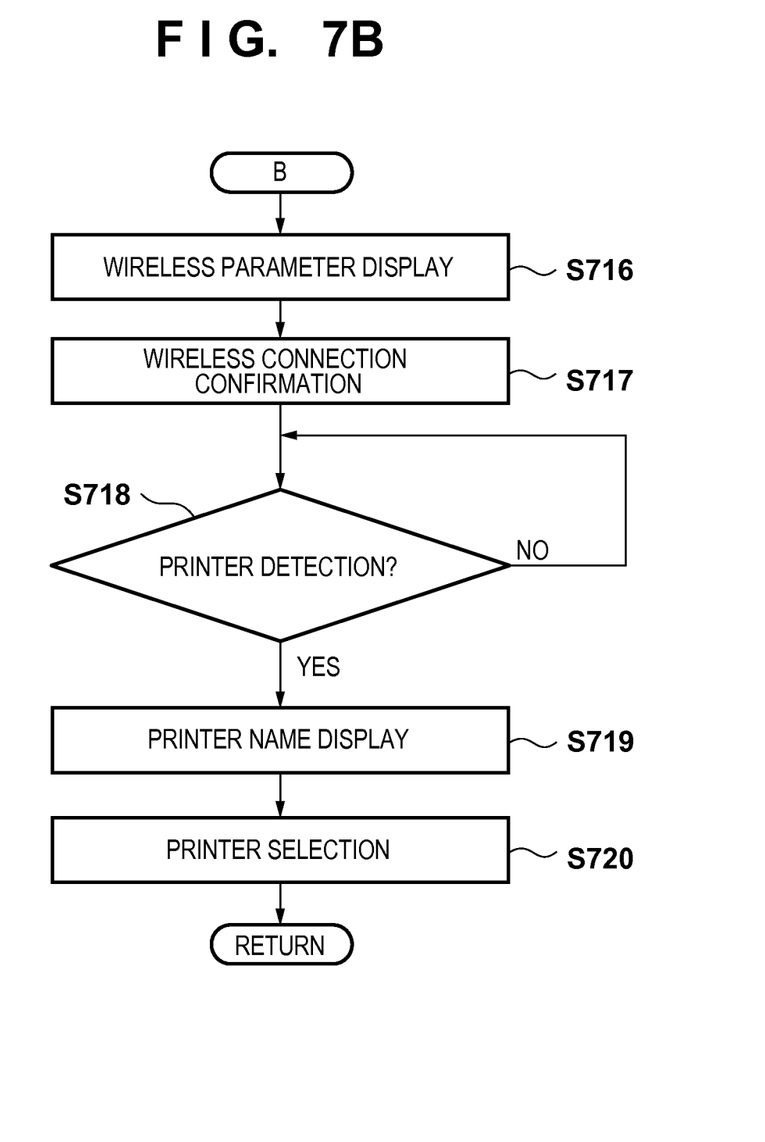
Figure 8:
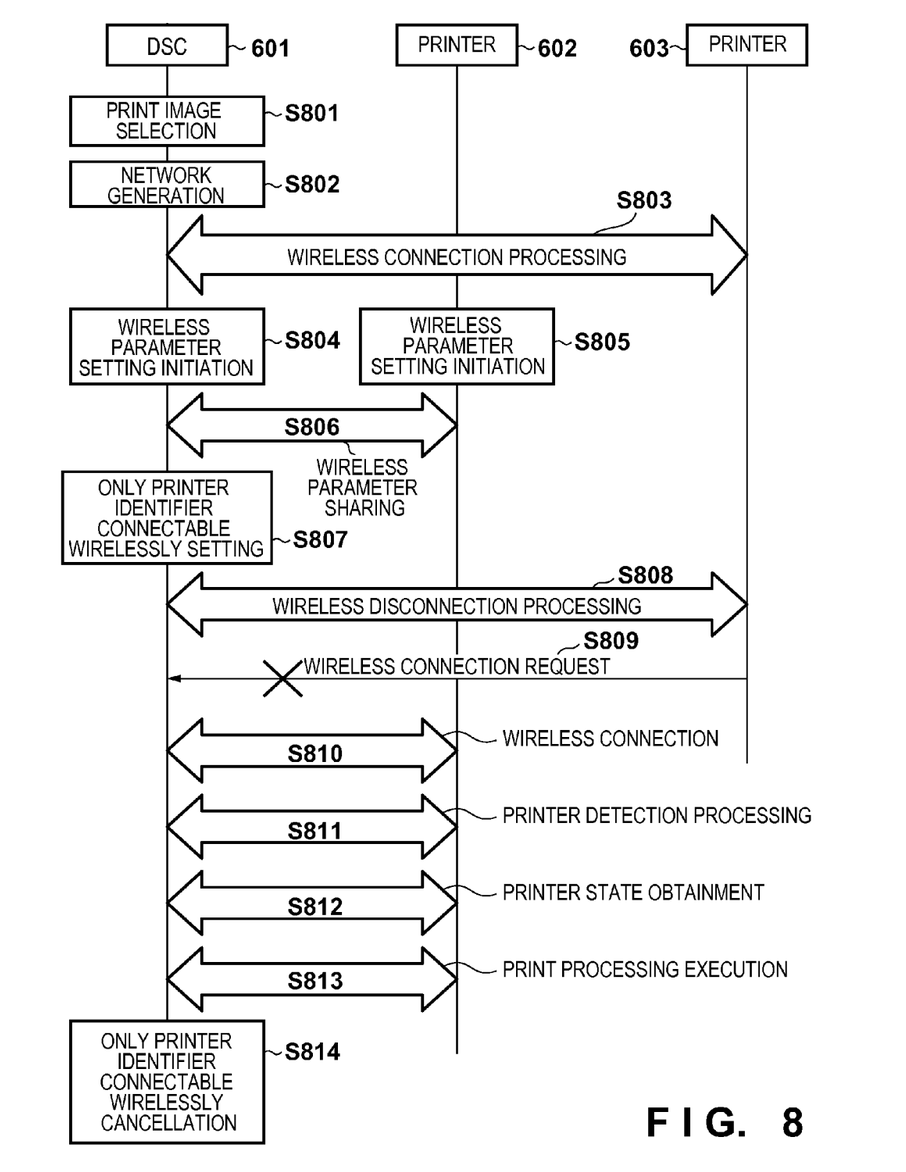
FIG. 8 is the sequence diagram of the communication apparatus (the DSC 601) and printing apparatuses (printers 602 and 603) according to the second embodiment.

Explanation will be given using flowcharts of FIG. 7A and FIG. 7B, and a sequence diagram of FIG. 8 for an approach for easily printing image data of the DSC 601 on the printer 602 in the communication system according to the embodiment. Firstly, it is assumed that a user of the DSC 601 tries to print image data stored in the DSC 601. The user of the DSC 601 selects an image that the user wishes to print, and using the display unit 205 and the operation unit 206 initiates print processing (step S701, step S801). The wireless parameter control unit 207 of the DSC 601, accompanying this operation, provides to the wireless communication function unit 204 that "SSID" is "CAMERA_1234" and network security is "WPA2", which are fixed wireless parameters, and the wireless communication function unit 204 generates the wireless network (step S702, step S802). The DSC 601, accompanying the operation, allows the user to select by displaying on the display unit 205 "registered printer" for selecting a printer that was used in the past and "new printer" for selecting a printer to user the first time (step S703), as shown in FIG. 3.

In this embodiment, the DSC 601 attempts to print on the printer 602, and because the printer 602 does not belong to any wireless network, the user selects "new printer" in order to select a printer to use for the first time. The user selects "new printer" which is displayed on the display unit 205 as is shown in FIG. 3 (step S704). The wireless parameter control unit 207 initiates the WPS function in order to provide the wireless parameters to devices that connect to the wireless network (step S705, step S804). The wireless parameter control unit 207 confirms whether or not it was possible to provide the wireless parameters to the printer 602 via the WPS function (step S706).

In a case where the WPS function is equipped in the printer 602, the DSC 601, by using the WPS function, shares the wireless parameters with the printer 602. In this embodiment, the printer 602 is equipped with the WPS function. Because the printer 602 is connected to the wireless network that the DSC 601 generates, the WPS function in the printer 602 is initiated (step S805). When the wireless network is generated by the DSC 601, the printer 602 acquires the wireless parameters via the WPS function (step S806). The printer 602, having obtained the wireless parameters by the above approach, is enabled to connect to the wireless network that the DSC 601 generated.

However, because even if the printer 603, which is not envisioned as a print destination, is in a state in which it is detecting the wireless network, a wireless connection is executed when the DSC 601 generates a wireless network based on the fixed wireless parameters (step S803). Accordingly, for the DSC 601, processing for restricting the print destination for the image data to the printer 602 is necessary.

The wireless print control unit 209 of the DSC 601, in WPS processing performed with the printer 602, obtains the device identifier of the printer 602. In addition, the wireless print control unit 209 restricts the wireless terminals connectable to the wireless network that the DSC 601 generates to only devices corresponding to that device identifier (step S707, step S807). Accompanying this processing, the printer 603 is disconnected (step S808) from the wireless network that the DSC 601 generated, and thereafter it becomes unable to join the wireless network (step S809).

The wireless print control unit 209 executes printer detection processing as confirmation processing to confirm that connected devices are printers (step S709, step S811). The wireless print control unit 209 restricts the wireless terminals connectable to the wireless network to only devices corresponding to the device identifier. Thus, the wireless terminal that is able to join the wireless network is only the printer 602, and only one printer is detected. Because, in a case where thereafter the DSC 601 can share the wireless parameters with the printer 602 by the WPS function, the processing for the user selecting the printer is unnecessary, the wireless print control unit 209 omits the printer selection processing.

Here, explanation will be given for a case where the WPS function is not equipped in the printer 602, and the wireless parameters could not be provided by the DSC 601 (step S715). In a case where the wireless parameter control unit 207 determines that could the wireless parameters could not be provided (step S706: No), the wireless parameter control unit 207 displays to the display unit 205 the generated wireless parameters (step S716). By inputting the wireless parameters displayed on the display unit 205 into the printer 602 by user operation, the printer 602 is enabled to connect to the wireless network that the DSC 601 generated (step S717, step S810). When the wireless print control unit 209 of the DSC 601 detects the printer connected to the wireless network (step S718, step S811), printer names are displayed to the display unit 205 (step S719), and the user selects a desired printer (step S720). Here, the reason that the printer names are displayed is that it is possible that one or more printers join the wireless network because the wireless parameters are displayed to the display unit 205 of the DSC 601 by previous processing. Processing for selecting the printer is necessary keeping this case in mind. Note, because, in the sequence diagram of FIG. 8, explanation is given for a case in which a WPS function is equipped in the printer, "printer selection processing" is not shown.

As in the approach described above, the print destination for the image data of the DSC 601 is determined. Then, the wireless print control unit 209 of the DSC 601 confirms whether or not the state is such that printing is possible for the printer (step S710, step S812). After this, image data is transmitted to the printer 602 from the DSC 601, and print processing is executed by the printer 602 (step S711, step S813). In a case where wireless terminals for which the wireless network is connectable are restricted by the device identifier, the wireless print control unit 209 cancels this after the print processing has completed (step S712, step S814).

In a case where "new printer" is selected (step S713: Yes), when the printing has completed, the wireless print control unit 209 stores in the storage unit 208 the wireless parameters used in the print processing, the printer name, and the device identifier of the printer in association (step S714). In a case where the print processing is executed thereafter, when "registered printer" of FIG. 3 is selected (step S703), the stored printer name will be displayed. By selection of the printer name, the wireless print control unit 209 is enabled to restrict terminals for which the wireless network is connectable by the stored device identifier (step S707, step S807). Thereafter, it becomes possible to perform a wireless print of image data of the DSC 601 on the printer 602 by executing the same processing (step S708-step S712, step S810-step S813).

As explained above, if the printer 602 is equipped with the WPS function, desired image data print processing within the DSC 601 becomes possible by the DSC 601 selecting a print image and executing only processing for selecting "registered printer" or "new printer". That is, it becomes possible for a user to print image data of the DSC 601 wirelessly on the printer 602 by simple operation. Also, by restricting a printer for which a wireless connection is permitted using information of a device identifier, it becomes possible to realize a connection with a desired printer.

The printing apparatus (printer) in the embodiments described above is only one example of an image processing apparatus, and the present invention can be adopted in other image processing apparatuses such as a scanner, a multi-function peripheral, a copying machine, a FAX, or a display apparatus. Also, the DSC in the embodiments described above is only one example of a communication apparatus, and the present invention can be adopted in other communication apparatus such as a PC, a mobile telephone, a smart phone, a mobile terminal, or a PDA.

By virtue of the present invention, it becomes possible for a load of an operation of a user to be reduced in a case where a communication apparatus such as a DSC and an image processing apparatus such as a printer are used by connecting wirelessly.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-248337, filed Nov. 29, 2013, which is hereby incorporated by reference herein in its entirety.

What is claimed is:

1. A communication apparatus, comprising:
a processor; and
a memory that stores a program which, when executed by the processor, causes the communication apparatus to:
select an image to be printed;
receive from a user an instruction for initiating processing of a wireless parameter automatic setting, in a state where the image to be printed is selected;
create a wireless network based on a wireless parameter;
perform the processing of a wireless parameter automatic setting with a partner apparatus that connects to the wireless network, so as to provide the partner apparatus with the wireless parameter;
determine whether or not the partner apparatus connected to the wireless network using the wireless parameter provided by the processing of a wireless parameter automatic setting is a printer apparatus; and
automatically transmit the selected image to the partner apparatus without performing a printer selection process by the user, in a case where it is determined that the partner apparatus is the printer apparatus.

2. The communication apparatus according to claim 1, wherein the program
further causes the communication apparatus to display a screen for selecting a printer in accordance with an initiation of printing processing being initiated, after the image to be printed is selected, wherein
the instruction for initiating the processing of the wireless parameter automatic setting is a selection of a new printer on the displayed screen.

3. The communication apparatus according to claim 2 wherein the selected image is transmitted to an already registered printer without performing the processing of the wireless parameter automatic setting, in a case where the already registered printer is selected on the displayed screen.

4. The communication apparatus according to claim 1 wherein the program, further causes the communication apparatus to generate a wireless network, in accordance with the instruction being received, wherein
the processing of the wireless parameter automatic setting is processing for providing a wireless parameter for connecting the generated wireless network with the partner apparatus.

5. The communication apparatus according to claim 4, further comprising a restriction unit configured to restrict an apparatus connectable to the wireless network generated by the communication apparatus to the partner apparatus with which the communication apparatus performs the processing of the wireless parameter automatic setting.

6. The communication apparatus according to claim 5, wherein
the restriction unit cancels the restriction after printing processing in the printer is completed.

7. The communication apparatus according to claim 1, wherein:
the processing of the wireless parameter automatic setting is WPS (Wi-Fi Protected Setup).

8. A method of controlling a communication apparatus, the method comprising:
selecting an image to be printed;
receiving from a user an instruction for initiating processing of a wireless parameter automatic setting, in a state where the image to be printed is selected
creating a wireless network based on a wireless parameter;
performing the processing of a wireless parameter automatic setting with a partner apparatus that connects to the wireless network, so as to provide the partner apparatus with the wireless parameter;
determining whether or not the partner apparatus connected to the wireless network using the wireless parameter provided by the processing of a wireless parameter automatic setting is a printer apparatus; and
automatically transmitting the selected image to the partner apparatus without performing a printer selection process by the user, in a case where it is determined that the partner apparatus is the printer apparatus.

9. A non-transitory computer-readable storage medium storing a computer program for causing a computer to execute a method of controlling a communication apparatus, the method comprising:
selecting an image to be printed;
receiving from a user an instruction for initiating processing of a wireless parameter automatic setting, in a state where the image to be printed is selected;
creating a wireless network based on a wireless parameter;
performing the processing of a wireless parameter automatic setting with a partner apparatus that connects to the wireless network, so as to provide the partner apparatus with the wireless parameter;
determining whether or not the partner apparatus connected to the wireless network using the wireless parameter provided by the processing of a wireless parameter automatic setting is a printer apparatus; and
automatically transmitting the selected image to the partner apparatus without performing a printer selection process by the user, in a case where it is determined that the partner apparatus is the printer apparatus.

* * * * *